United States Patent
Nohara

(10) Patent No.: US 6,385,274 B1
(45) Date of Patent: May 7, 2002

(54) WATCHDOG TIMER FOR RESETTING MICROCOMPUTER BEFORE RUNAWAY

(75) Inventor: Tomonori Nohara, Hyogo (JP)

(73) Assignees: Mitsubishi Denki Kabushiki Kaisha, Chiyoda-ku; Mitsubishi Electric System LSI Design Corporation, Itami, both of (JP)

( * ) Notice: Subject to any disclaimer, the term of this patent is extended or adjusted under 35 U.S.C. 154(b) by 51 days.

(21) Appl. No.: 09/589,067

(22) Filed: Jun. 8, 2000

(30) Foreign Application Priority Data

Dec. 24, 1999 (JP) .......................................... 11-368247

(51) Int. Cl.$^7$ ................................................. G07C 3/00
(52) U.S. Cl. ............................. 377/20; 377/16; 377/28; 377/51; 377/54
(58) Field of Search ............................. 377/20, 16, 28, 377/51, 54

(56) References Cited

U.S. PATENT DOCUMENTS

| | | | |
|---|---|---|---|
| 5,414,378 A | 5/1995 | Edgar et al. | ................ 327/143 |
| 5,627,867 A | * 5/1997 | Thomson | ..................... 377/16 |
| 6,188,256 B1 | * 2/2001 | Birns et al. | ................... 377/16 |

FOREIGN PATENT DOCUMENTS

JP  6-59779  3/1994

* cited by examiner

*Primary Examiner*—Margaret R. Wambach
(74) *Attorney, Agent, or Firm*—Burns, Doane, Swecker & Mathis, LLP

(57) ABSTRACT

A watchdog timer includes an instruction decoder, a delay circuit and a counter. The instruction decoder decodes a watchdog timer initialization instruction regularly executed to generate an instruction pulse for initializing the count of the counter. The delay circuit delays the rising edge of the instruction pulse, and supplies the delayed instruction pulse to the counter as a signal for initializing the count. The delay circuit prevents the pulse signal from being supplied to the counter when the operation frequency of the microcomputer is high or when the supply voltage to the microcomputer is low, so that the count of the counter overflows, and the overflow signal causes the microcomputer to be reset. This makes it possible to reset the microcomputer before it runs away, thereby solving a problem of a conventional watchdog timer in that the microcomputer can produce, if it runs away, an unexpected signal from its port before it is reset, and hence can impair the security of the system.

14 Claims, 8 Drawing Sheets

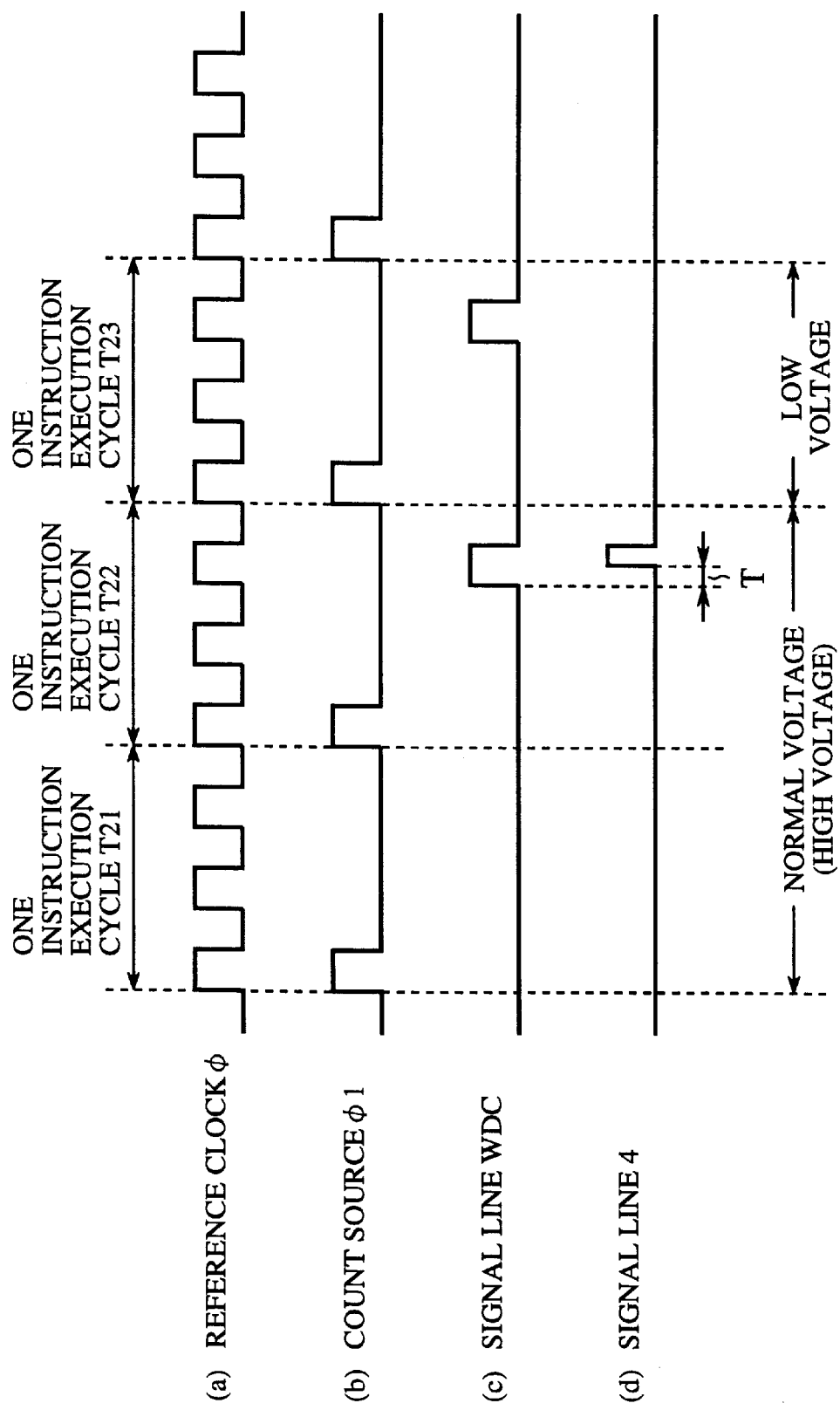

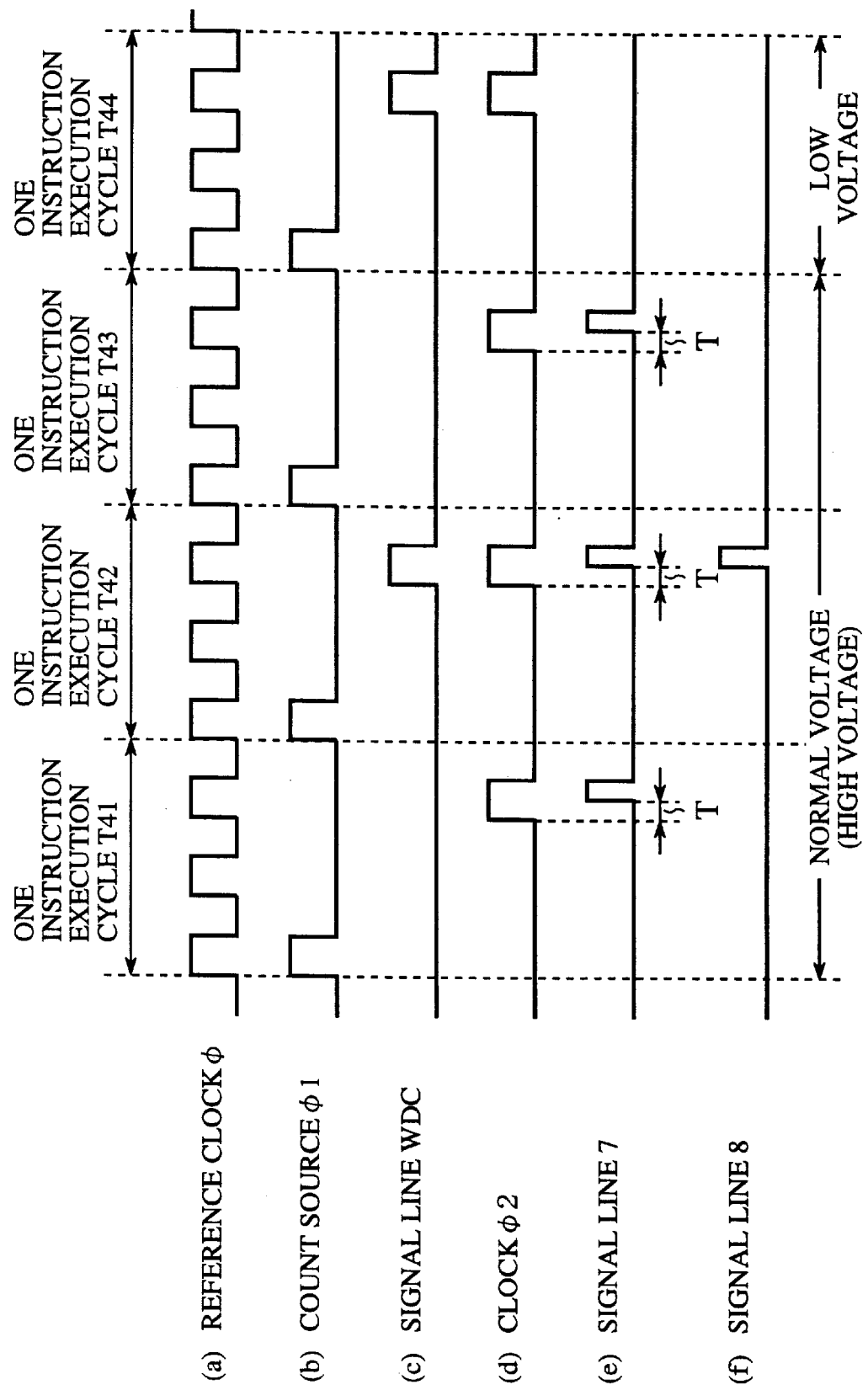

WATCHDOG TIMER FOR RESETTING MICROCOMPUTER BEFORE RUNAWAY

BACKGROUND OF THE INVENTION

1. Field of the Invention

The present invention generally relates to a watchdog timer that is embedded in a microcomputer incorporated into electronic equipment to reset the microcomputer if it runs away, and particularly to a watchdog timer that can reset the microcomputer before it runs away by detecting a narrow operation margin state such as a low supply voltage and a high operation frequency, thereby ensuring the safety of the system incorporating the microcomputer.

2. Description of Related Art

Recently, various types of circuits are embedded into microcomputer chips as a countermeasure against runaway of microcomputers incorporated into electronic equipment. A watchdog timer, one of such circuits, has a function to detect the microcomputer chip running away, and to reset the microcomputer.

FIG. 11 is a block diagram showing a configuration of a conventional watchdog timer. In this figure, the reference numeral 1 designates a counter that receives a clock $\phi 1$ as a count source, and outputs an overflow signal when its count reaches a predetermined number. The overflow signal is supplied to a system reset terminal (not shown) as a reset signal of the microcomputer.

The reference numeral 3 designates an instruction decoder that sequentially decodes instructions and outputs decoded results 5. When decoding a watchdog timer initialization instruction, the decoder 3 imposes an instruction pulse on a signal line WDC. The instruction pulse on the signal line WDC is supplied to the counter 1 as an initializing signal for initializing the count of the counter 1. The counter 1, receiving the instruction pulse via the signal line WDC, initializes its count. When producing software, the watchdog timer initialization instruction is inserted into a software loop at such intervals that can prevent the overflow of the counter 1. This can prevent, as long as the microcomputer operates normally, the reset signal from being output from the counter 1 because the instruction decoder 3 regularly supplies the instruction pulse to the counter 1 and hence the count of the counter 1 is initialized regularly.

However, if the microcomputer runs away because of a narrow operation margin state such as a low supply voltage or a high operation frequency, or because of incoming noise, it cannot execute the software loop normally, thereby hampering regular generation of the instruction pulse, disabling the regular initialization of the count of the counter 1. As a result, the counter 1 overflows, generates the reset signal, and supplies it to the system reset terminal (not shown), thus resetting the microcomputer.

With the foregoing configuration, the conventional watchdog timer cannot reset the microcomputer before it runs away. This presents a problem of being unable to ensure the safety of the system, into which the microcomputer is incorporated, because an unexpected signal can be output from a port of the microcomputer in the interval between the runaway of the microcomputer and the actual reset of the microcomputer, during which the overflow of the count of the counter 1 and the supply of the reset signal to the system reset terminal take place. Thus, the conventional watchdog timer has a problem of being unable to secure the safety of the system because it cannot detect the low voltage state or incoming noise, and hence cannot reset the microcomputer until the microcomputer actually runs away.

SUMMARY OF THE INVENTION

The present invention is implemented to solve the foregoing problems. It is therefore an object of the present invention to provide a watchdog timer capable of implementing the safety of the system into which the microcomputer is incorporated by resetting the microcomputer before it runs away, that is, during its normal operation, by detecting the occurrence of a narrow operation margin state such as a low supply voltage and a high operation frequency, in addition to the function of the conventional watchdog timer to detect the runaway of the microcomputer and reset it.

According to a first aspect of the present invention, there is provided a watchdog timer comprising: a counter for counting a first clock, and for outputting, when its count reaches a predetermined number, a reset signal for resetting operation of a microcomputer; an instruction decoder for decoding a watchdog timer initialization instruction regularly executed, and for outputting a first pulse signal used for initializing the count of the counter; and a delay circuit for delaying a rising edge of the first pulse signal, and for supplying the counter with the delayed first pulse signal as an initializing signal of the count, wherein the delay circuit prevents the first pulse signal from being supplied to the counter if at least one of two cases takes place in which an operation frequency of the microcomputer is higher than a predetermined frequency, and a supply voltage to the microcomputer is lower than a predetermined value.

According to a second aspect of the present invention, there is provided a watchdog timer comprising: a counter for counting a first clock, and for outputting, when its count reaches a predetermined number, a reset signal for resetting operation of a microcomputer; an instruction decoder for decoding a watchdog timer initialization instruction regularly executed, and for generating a first pulse signal used for initializing the count of the counter; and a delay circuit for delaying a rising edge of a second clock having a same timing as the first pulse signal output from the instruction decoder, and for outputting as a second pulse signal the second clock with its rising edge delayed by a predetermined time period, wherein the delay circuit prevents the second pulse signal from being output if at least one of two cases takes place in which an operation frequency of the microcomputer is higher than a predetermined frequency, and a supply voltage to the microcomputer is lower than a predetermined value; and an AND circuit for performing an AND operation between the first pulse signal supplied from the instruction decoder and the second pulse signal supplied from the delay circuit, and for supplying a result of the AND operation to the counter as an initializing signal of the count.

Here, the watchdog timer may further comprise: an n-bit shift register for successively loading a logical high level in response to the second clock, and for initializing, in response to the second pulse signal supplied from the delay circuit, all bits of then-bit shift register simultaneously to a logical low level; and an NAND circuit for carrying out an NAND operation between all the bits of the n-bit shift register, and supplies its operation result to the AND circuit, wherein the n-bit shift register and the NAND circuit are interposed between the delay circuit and the AND circuit.

The watchdog timer may further comprise a CPU for discriminating the operation result of the NAND circuit using software.

The CPU may make a decision of the operation result output from the NAND circuit, and generate an interrupt in response to the decision of the operation result before a reset signal is output by an overflow of the count of the counter.

The delay circuit may comprise: an even number of inverters connected in series; a plurality of load capacitors connected between a ground and nodes between adjacent inverters; and an AND circuit for performing an AND operation between a signal input to an initial stage inverter and a signal output from a final stage inverter of the even number inverters.

The delay circuit may comprise: an even number of inverters connected in series; a plurality of load capacitors connected between a ground and nodes between adjacent inverters; an AND circuit for performing an AND operation between a signal input to an initial stage inverter and a signal output from a final stage inverter of the even number inverters; a register for storing a set value for determining a value of the load capacitors in the delay circuit; and a first selector for adjusting the value of the load capacitors in the delay circuit in response to the set value placed in the register.

The delay circuit may comprise: an even number of inverters connected in series; a plurality of load capacitors connected between a ground and nodes between adjacent inverters; an AND circuit for performing an AND operation between a signal input to an initial stage inverter and a signal output from a final stage inverter of the even number inverters; a register for storing a set value for determining a number of stages of the even number inverters in the delay circuit; and a second selector for selecting the number of stages of the even number inverters in the delay circuit in response to the set value placed in the register.

The delay circuit may comprise: an even number of inverters connected in series; a plurality of load capacitors connected between a ground and nodes between adjacent inverters; an AND circuit for performing an AND operation between a signal input to an initial stage inverter and a signal output from a final stage inverter of the even number inverters; a register for storing a set value for determining a value of the load capacitors and a number of stages of the even number inverters in the delay circuit; and a second selector for selecting the value of the load capacitors and the number of stages of the even number inverters in the delay circuit in response to the set value placed in the register.

According to a third aspect of the present invention, there is provided a watchdog timer comprising: a counter for counting a first clock, and for outputting, when its count reaches a predetermined number, a reset signal for resetting operation of a microcomputer; an instruction decoder for decoding a watchdog timer initialization instruction regularly executed, and for generating a first pulse signal used for initializing the count of the counter; a supply voltage detector for detecting a level of a supply voltage to the microcomputer, and for outputting a high-level signal when the level of the supply voltage is greater than a predetermined level; and an AND circuit for performing an AND operation between the first pulse signal supplied from the instruction decoder and the high-level signal supplied from the supply voltage detector, and for supplying a result of the AND operation to the counter as an initializing signal of the count.

BRIEF DESCRIPTION OF THE DRAWINGS

FIG. 2 is a timing chart illustrating the operation of the watchdog timer as shown in FIG. 1;

FIG. 4 is a timing chart illustrating the operation of the watchdog timer as shown in FIG. 3;

DETAILED DESCRIPTION OF THE PREFERRED EMBODIMENTS

The invention will now be described with reference to the accompanying drawings.

Embodiment 1

Figure 1:
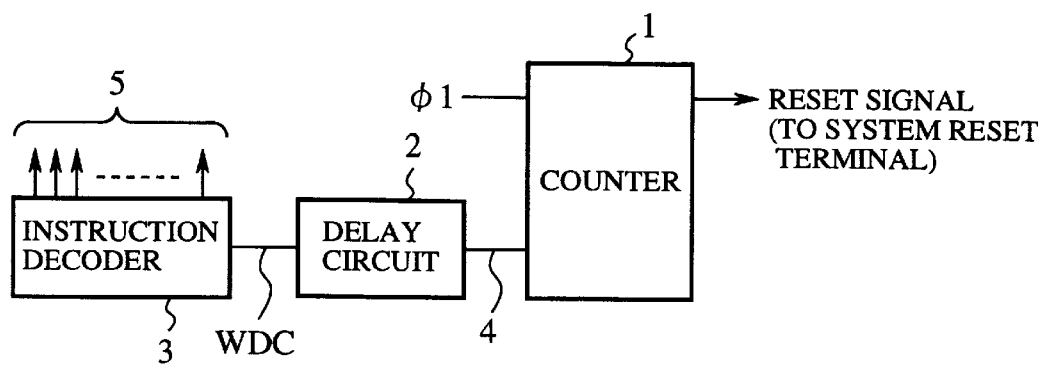
FIG. 1 is a block diagram showing a configuration of an embodiment 1 of a watchdog timer in accordance with the present invention.

FIG. 1 is a block diagram showing a configuration of an embodiment 1 of a watchdog timer in accordance with the present invention. In this figure, the reference numeral 1 designates a counter, 2 designates a delay circuit, and 3 designates an instruction decoder. The counter 1 receives a clock $\phi 1$ (first clock) as a count source, and outputs an overflow signal when its count reaches a predetermined number. The overflow signal is supplied to a system reset terminal (not shown) of the microcomputer as its reset signal.

The instruction decoder 3 sequentially decodes instructions and outputs decoded results 5. When decoding the watchdog timer initialization instruction, the decoder 3 generates an instruction pulse (first pulse signal), and imposes it on a signal line WDC. The delay circuit 2 delays only the rising edge of the instruction pulse supplied via the signal line WDC by a predetermined time period. The signal is supplied from the delay circuit 2 to the counter 1, and is used as an initializing signal of the counter 1.

Next, the operation of the present embodiment 1 will be described.

FIG. 2 is a timing chart illustrating the operation of the watchdog timer of the present embodiment 1 as shown in FIG. 1. In FIG. 2, the reference symbol $\phi$ designates a reference clock for operating the microcomputer. A clock generator (not shown) generates from the reference clock $\phi$ the count source $\phi 1$ to be supplied to the counter 1. The reference symbol T designates the delay of the rising edge of the instruction pulse output from the delay circuit 2. The delay amount is determined in advance at such a value that meets a desired function of the watchdog timer.

Figure 7:
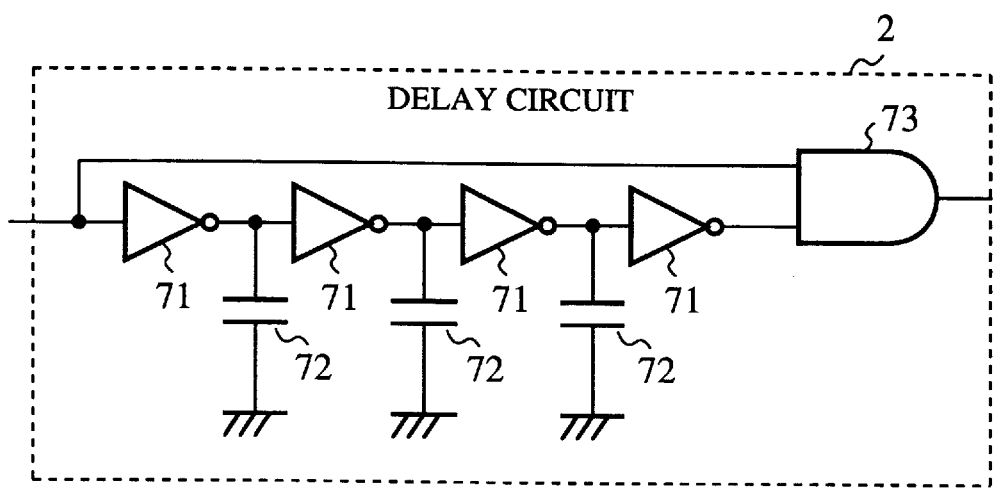
FIG. 7 is a block diagram showing a configuration of a delay circuit incorporated into the watchdog timer in accordance with the present invention.

FIG. 7 is a block diagram showing a configuration of the delay circuit 2 in the watchdog timer as shown in FIG. 1. In this figure, reference numerals 71 designate an even number of inverters connected in series; and 72 designate load capacitors connected between a ground and nodes between adjacent inverters. Although each inverter 71 consists of a plurality of MOS transistors or the like, the description thereof is omitted here because its structure is a known matter. The delay circuit 2 will increase its delay with a decrease in the supply voltage because the inverters 71 reduce their driving power as the supply voltage drops.

When the delay of the delay circuit 2 is small, that is, when the supply voltage is high or normal, the watchdog timer initialization instruction, which is executed regularly by the instruction decoder 3, will supply its instruction pulse to the counter 1 continuously through the delay circuit 2 and signal line 4 (timing T22). Accordingly, the count of the counter 1 does not overflow, generating no reset signal, and hence preventing the microcomputer from being reset.

Thus, in the high-voltage mode (normal voltage mode) in which the microcomputer operates normally, the count of the counter 1 is initialized every time it receives the instruction pulse from the instruction decoder 3 through the signal line WDC. When producing software, the watchdog timer initialization instructions are inserted into the software loop at such periods that can prevent the overflow of the count of the counter 1. This enables the counter 1 to receive the instruction pulses generated regularly by instruction decoder 3 when the microcomputer operates normally. The instruction pulses serve as the initializing signal of the counter 1 that regularly initializes the count of the counter 1. This can prevent the counter 1 from outputting the reset signal to the system reset terminal of the microcomputer.

In contrast with this, consider the case where the supply voltage is on a lower side and hence the delay amount T exceeds the width of the instruction pulses generated by the instruction decoder 3 executing the watchdog timer initialization instructions. In this case, even though it regularly executes the watchdog timer initialization instructions and outputs the instruction pulses, the instruction pulses do not appear on the signal line 4 connecting the delay circuit 2 with the counter 1 (timing T23), and hence the counter 1 cannot be cleared. Likewise, at a high operation frequency, even though the instruction decoder 3 regularly executes the watchdog timer initialization instructions and outputs the instruction pulses, no instruction pulse is output from the delay circuit 2 because its width becomes narrower than the delay amount T of the delay circuit 2. As a result, the counter 1 continues to count the clock φ1, and overflows when its count reaches the predetermined value, thereby outputting the reset signal to the system reset terminal (not shown), causing the microcomputer to be reset.

If the microcomputer suddenly runs away because of the incoming noise taking place in the high-voltage mode (normal voltage mode) of the supply voltage in which the delay amount T is small, the instruction decoder 3 cannot execute the regular watchdog timer initialization instructions as the conventional watchdog timer. This will continuously increase the count of the counter 1 until it overflows and outputs the reset signal to the system reset terminal (not shown), causing the microcomputer to be reset.

As described above, the present embodiment 1 is configured such that it comprises the instruction decoder for regularly decoding the watchdog timer initialization instructions, and the delay circuit connected between the instruction decoder and the counter, and supplies the counter with the instruction pulses output from the delay circuit as the initializing signal of the count. This enables the watchdog timer not only to detect the runaway of the microcomputer as the conventional watchdog timer, but also to detect before the runaway the narrow operation margin state such as a low supply voltage or a high operation frequency, and to reset the microcomputer positively, offering an advantage of being able to ensure the safety of the system. In addition, the characteristic of detecting the operation margin with the delay circuit composed of the inverters and load capacitors formed on the same semiconductor chip nearly matches the operation margin of the microcomputer. This offers an advantage of being able to positively reset the microcomputer before it runs away, ensuring the safety of the system.

Embodiment 2

Figure 3:
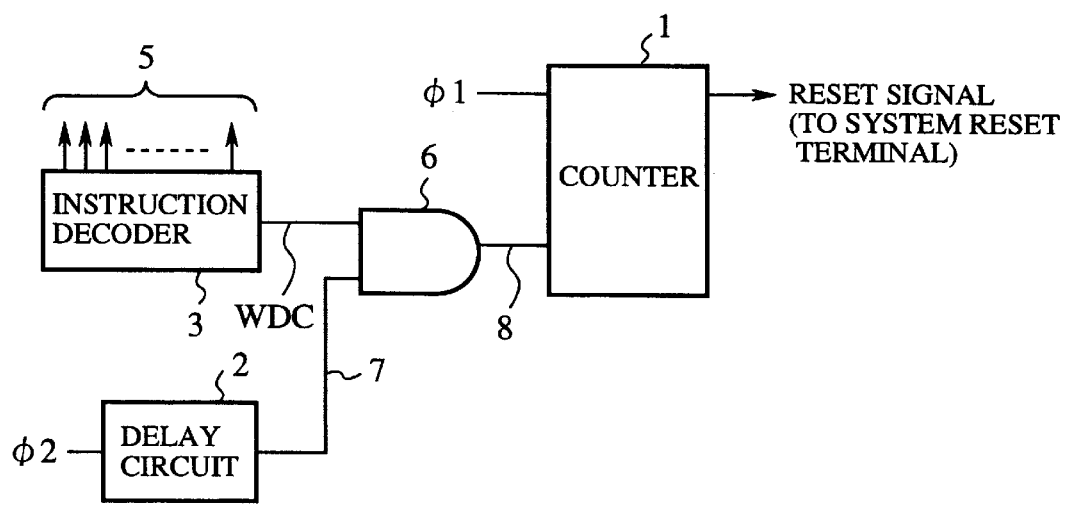
FIG. 3 is a block diagram showing a configuration of an embodiment 2 of the watchdog timer in accordance with the present invention.

FIG. 3 is a block diagram showing a configuration of an embodiment 2 of the watchdog timer in accordance with the present invention. In this figure, the reference numeral 1 designates a counter; 2 designates a delay circuit for receiving a clock (second clock) φ2 and for outputting a signal obtained by delaying the clock φ2 by a predetermined time period; 3 designates an instruction decoder: 6 designates an AND circuit that receives the instruction pulse from the instruction decoder 3 and the delay signal from the delay circuit 2, performs the logical AND operation between them, and outputs the result of the AND operation as a reset signal of the counter 1. Since the structure and operation of the counter 1, delay circuit 2 and instruction decoder 3 are the same as those of the watchdog timer of the foregoing embodiment 1 shown in FIG. 1, the description thereof is omitted here. Here, the timing of the instruction pulses output from the instruction decoder 3 executing the watch dog timer initialization instructions as in the foregoing embodiment 1 is the same as that of the clock φ2.

Next, the operation of the present embodiment 2 will be described.

FIG. 4 is a timing chart illustrating the operation of the watchdog timer of the present embodiment 2 as shown in FIG. 3. In this figure, the reference symbol φ designates the reference clock for operating the microcomputer. The count source φ1 to be supplied to the counter 1 is generated from the reference clock φ by a clock generator (not shown). The counter 1 counts the clock φ1, and generates an overflow signal when its count reaches a predetermined number. The overflow signal, which constitutes a reset signal of the microcomputer, is supplied to the system reset terminal (not shown).

The reference symbol T designates the delay of the rising-edge of the clock φ2 the delay circuit 2 brings about. It outputs the delayed signal as a pulse signal (second pulse signal) through the signal line 7. The delay amount T is set at a predetermined value so that the watchdog timer achieves the desired function. The clock φ2 is generated by the clock generator (not shown) as the clock φ1, and is supplied to the delay circuit 2. The pulse signal (second pulse signal) whose rising edge is delayed by the predetermined time period T by the delay circuit 2 is supplied to the AND circuit 6. The operation result by the AND circuit 6 is supplied to the counter 1 as the initializing signal of the counter 1 through the signal line 8.

In the high-voltage mode (normal voltage mode) in which the microcomputer can operate normally, the operation result of the AND circuit 6 is supplied to the counter 1 through the signal line 8. Receiving the operation result, the counter 1 clears its count. In the process of creating software, the watchdog timer initialization instructions are inserted into a software loop at intervals that will prevent the counter 1 from overflowing. Accordingly, in the normal operation mode of the microcomputer, the instruction pulses the instruction decoder 3 regularly generates are input to the AND circuit 6, so that the AND circuit 6 supplies, as its operation result, a high-level signal to the counter 1 via the signal line 8 (timing T42). The high-level signal serves as the initializing signal of the counter 1 for clearing the count of the counter 1 regularly. This can prevent the counter 1 from outputting the overflow signal, that is, the reset signal of the microcomputer to the system reset terminal (not shown).

On the other hand, consider the case where the operation frequency of the clock $\phi 2$ is high or where the delay T of the delay circuit 2 exceeds the width of the clock $\phi 2$ regularly supplied to the delay circuit 2 because of the low supply voltage. In this case, although the timing of the instruction pulses obtained as a result of the regular execution of the watchdog timer initialization instructions is the same as that of the clock $\phi 2$, the driving power of the inverter 71 in the delay circuit 2 reduces, and hence the delay amount T between the clock $\phi 2$ and the rising edge of the output signal from the delay circuit 2 increases. As a result, the output pulse of the delay circuit 2 does not appear on the signal line 7 connecting the delay circuit 2 to the AND circuit 6, placing the level on the signal line 7 at the low level (timing T44). Thus, the counter 1 continues to count the clock $\phi 1$ without being cleared, resulting in the overflow of the counter 1 when its count reaches the predetermined value. The reset signal thus produced is supplied to the system reset terminal (not shown), causing the microcomputer to be reset.

As described above, the present embodiment 2 is configured such that it comprises the delay circuit 2 that delays the rising edge of the input clock $\phi 2$ by the predetermined time period T and outputs it as the pulse signal; and the AND circuit 6 that receives the pulse signal output from the delay circuit 2 and the instruction pulse output from the instruction decoder 3, carries out the logical AND operation between them, and supplies the operation result to the counter 1 as the initializing signal of the count. This enables the watchdog time of the present invention, besides the function of the conventional watchdog timer to detect the runaway of the microcomputer, to detect the narrow operation margin state of the microcomputer such as a low supply voltage or a high operation frequency, and to positively reset the microcomputer before it runs away. This offers an advantage of being able to ensure the safety of the system. In addition, the characteristic of detecting the operation margin with the delay circuit 2 composed of the inverters and load capacitors formed on the same semiconductor chip nearly matches the operation margin of the microcomputer. This offers an advantage of being able to positively reset the microcomputer before it runs away, ensuring the safety of the system into which the microcomputer is incorporated.

Embodiment 3

Figure 5:
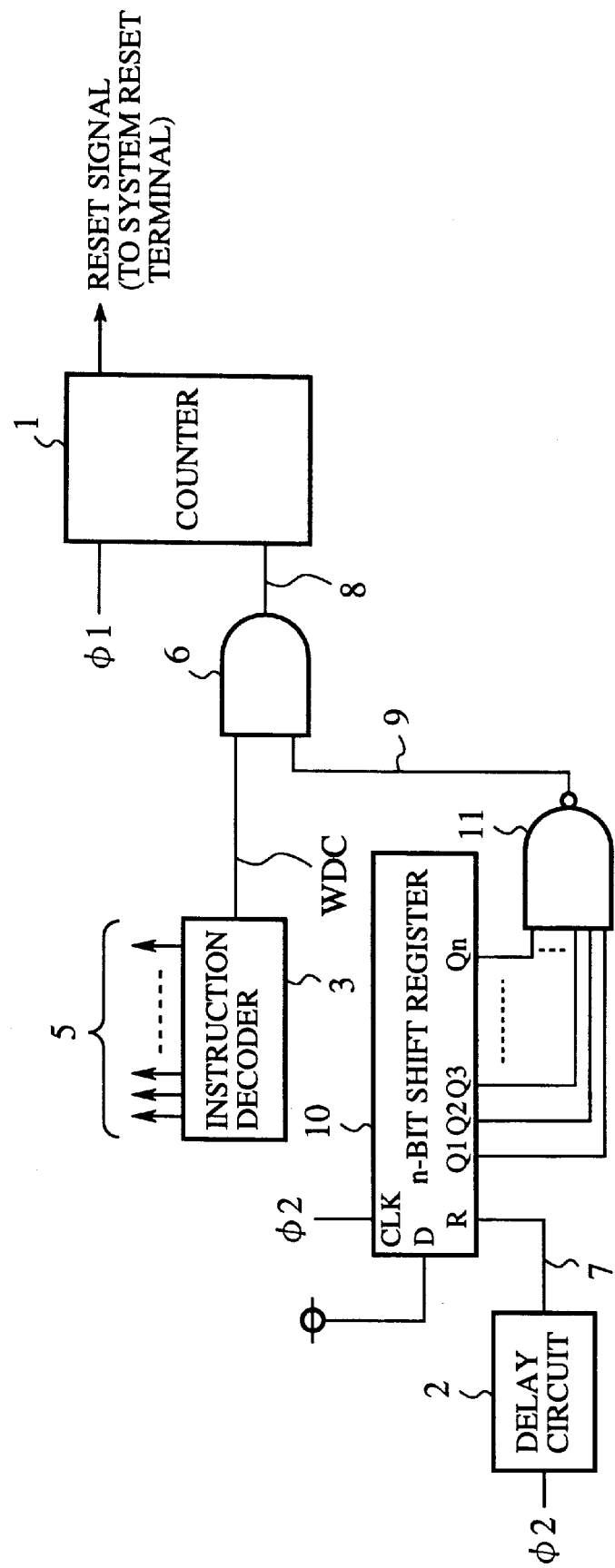
FIG. 5 is a block diagram showing a configuration of an embodiment 3 of the watchdog timer in accordance with the present invention.

FIG. 5 is a block diagram showing a configuration of an embodiment 3 of the watchdog timer in accordance with the present invention. In this figure, the reference numeral 1 designates a counter; 2 designates a delay circuit; 3 designates an instruction decoder; 6 designates an AND circuit that receives the instruction pulse from the instruction decoder 3 and an output signal from an NAND circuit 11, performs the logical AND operation between them, and outputs its operation result as the count initializing signal of the counter 1; 10 designates an n-bit shift register; and 11 designates the n-input NAND circuit. Since the counter 1, delay circuit 2, instruction decoder 3 and AND circuit 6 are the same as those of the watchdog timer of the embodiment 2 as shown in FIG. 3, the description thereof is omitted here.

Next, the operation of the present embodiment 3 will be described.

The AND circuit 6 has its first input connected to the signal line WDC that transfers the instruction pulse output from the instruction decoder 3, and its second input connected to the output line 9 of the n-input NAND circuit 11. The n-input NAND circuit 11 receives, as its n inputs, bit values Q1–Qn supplied from the n-bit shift register 10 that uses the clock $\phi 2$ as its shift clock.

The n-bit shift register 10 uses the pulse signal output from the delay circuit 2 as its initializing signal. When the n-bit shift register 10 is not supplied with the initializing signal, the bit values Q1–Qn sequentially take the high level in synchronism with the clock $\phi 2$. In contrast, when the n-bit shift register 10 receives the initializing signal, all its bits are placed at the low level simultaneously. The AND circuit 6 supplies its output to the counter 1 through the signal line 8, so that the output is used as the initializing signal of the count of the counter 1. The clock $\phi 1$ serves as the count source of the counter 1, and the overflow signal output from the counter 1 is used as the reset signal of the microcomputer.

The operation of the present embodiment 3 will be described with reference to FIG. 4, the timing chart illustrating the operation of the foregoing embodiment 2 of the watchdog timer, in which the reference symbol $\phi$ designates the reference clock for operating the microcomputer. The count source $\phi 1$ supplied to the counter 1 is generated from the reference clock $\phi$ by the clock generator (not shown).

The reference symbol T designates a delay amount of the delay circuit 2 that brings about the rising-edge delay of the clock $\phi 2$. The delay amount T is set at a predetermined value so that the watchdog timer achieves the desired function. The clock $\phi 2$ supplied to the delay circuit 2 is also generated by the clock generator (not shown). The pulse signal whose rising edge is delayed by the predetermined time period T by the delay circuit 2 is supplied to the n-bit shift register 10 as the initializing signal. Each inverter 71 constituting the delay circuit 2 as shown in FIG. 7 consists of a plurality of MOS transistors or the like, and reduces its driving power as the supply voltage decreases, resulting an increase in the delay amount.

When the delay T of the delay circuit 2 is small, that is, when the microcomputer operates normally at the high voltage (normal voltage), the clock $\phi 2$ is regularly input to the delay circuit 2, causing the pulse signal to appear on the signal line 7 connected to the output of the delay the circuit 2. The pulse signal on the signal line 7 is used as the initializing signal of the n-bit shift register 10, which initializes all the bit values Q1–Qn of the n-bit shift register 10 to the low level simultaneously. Accordingly, the n-input NAND circuit 11 outputs a high-level signal, placing the level on the signal line 9 connecting the n-input NAND circuit 11 to the AND circuit 6 at the high level.

The AND circuit 6 carries out the AND operation between the high-level signal on the signal line 9 and the instruction pulse on signal line WDC, which is output by the instruction decoder 3 when it executes the watchdog timer initialization instruction. Thus, a high-level pulse appears on the signal line 8, clearing the count of the counter 1. As a result, the count of the counter 1 does not overflow. This prevents the reset signal from being supplied from the counter 1 to the system reset terminal (not shown), and hence the microcomputer is not reset.

In contrast with this, in the event of the delay T exceeding the width of the instruction pulses generated by the execution of the watchdog timer initialization instructions because of the low supply voltage, or in the event of the high operation frequency, although the watchdog timer initialization instructions are executed regularly, the level on the signal line 7 connecting the delay circuit 2 to the n-bit shift register 10 is fixed at the low level. Therefore, the bit values Q1–Qn of the n-bit shift register 10 are not cleared, but are successively placed at the high level in synchronism with the clock $\phi 2$. When the signal line 7 continues the low level state, all the bit values Q1–Qn become high level, which will maintain the level on the output line 9 of the n-input NAND circuit 11 at the low level.

Thus, the level on the signal line 8 connecting the AND circuit 6 to the counter 1 is placed at the low level because of the logical AND between the low-level signal on the signal line 9 and the high-level instruction pulse on the signal line WDC obtained by the instruction decoder 3 when it executes the watchdog timer initialization instruction. This will prevent the counter 1 from initializing its count. Accordingly, the counter 1 continues counting the clock $\phi 1$, and overflows when the count reaches the predetermined value. As a result, the reset signal is supplied to the system reset terminal (not shown), causing the microcomputer to be reset. In the present embodiment 3, the n-bit shift register 10 ensures that the value on the signal line 7 is fixed at the low level for a certain time period. This makes it possible to prevent the microcomputer from being inappropriately reset because of a temporary voltage drop that does not lead to the runaway.

On the other hand, if the microcomputer suddenly runs away because of the incoming noise taking place in the high-voltage mode (normal voltage mode) in which the delay amount T is small, the instruction decoder 3 cannot execute the regular watchdog timer initialization instructions as the conventional watchdog timer. This will continuously increase the count of the counter 1 until it overflows and outputs the reset signal to the system reset terminal (not shown), causing the microcomputer to be reset.

As described above, the present embodiment 3 is configured such that it comprises the delay circuit that delays the input clock $\phi 2$ by the predetermined time period and outputs the delayed pulse signal as the initializing signal of the n-bit shift register; the NAND circuit for NANDing the plurality of outputs of the n-bit shift register; and the AND circuit that carries out the logical AND operation between the output of the NAND circuit and the instruction pulse output from the instruction decoder. This enables the watchdog time of the present invention, besides the function of the conventional watchdog timer for detecting the runaway of the microcomputer, to detect the narrow operation margin state of the microcomputer such as a low supply voltage or a high operation frequency, and to positively reset the microcomputer before it runs away. This offers an advantage of being able to ensure the safety of the system into which the microcomputer is incorporated. Furthermore, ensuring the detection of the reduction in the operation margin by the n-bit shift register 10 offers an advantage of being able to avoid the inappropriate reset. In addition, since the characteristic of detecting the operation margin with the delay circuit, which is composed of the inverters and load capacitors formed on the same semiconductor chip, nearly matches the operation margin of the microcomputer, the microcomputer is positively reset before it runs away. This offers an advantage of being able to ensure the safety of the microcomputer system.

Embodiment 4

Figure 6:
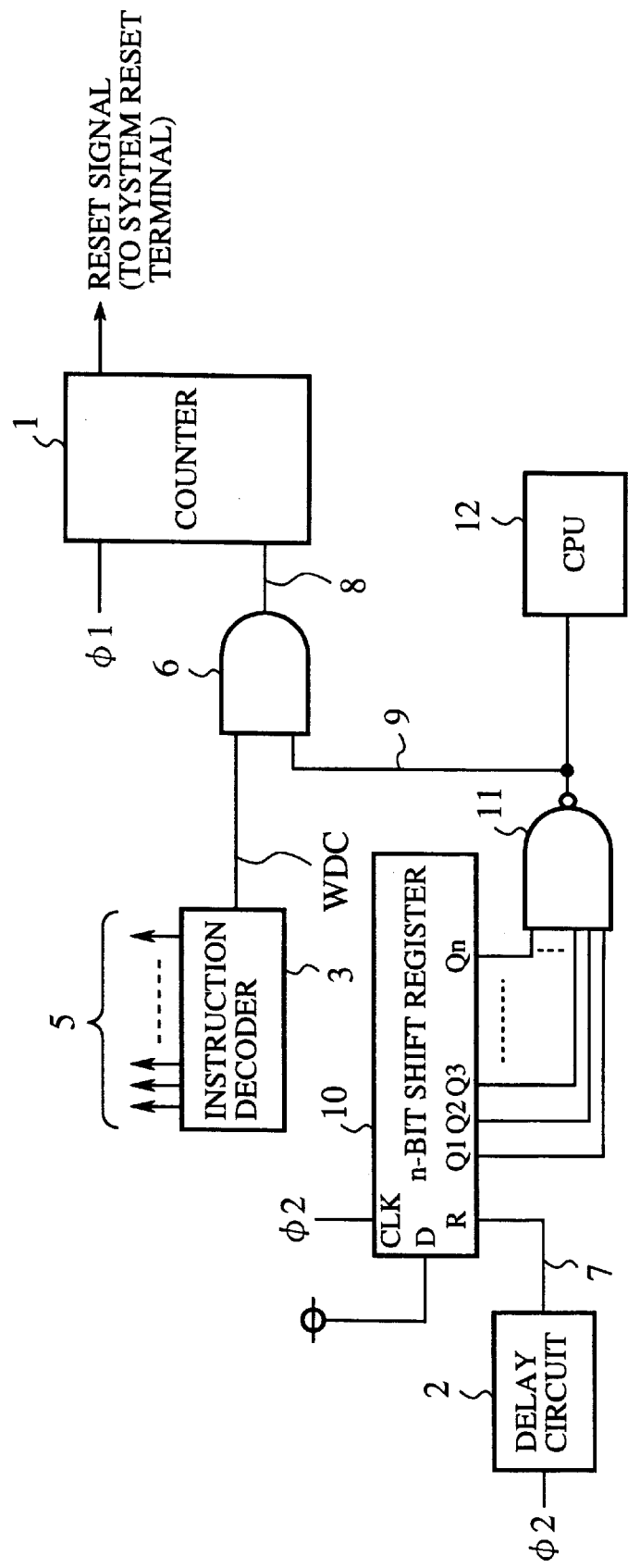
FIG. 6 is a block diagram showing a configuration of an embodiment 4 of the watchdog timer in accordance with the present invention.

FIG. 6 is a block diagram showing a configuration of an embodiment 4 of the watchdog timer in accordance with the present invention. In this figure, the reference numeral 1 designates a counter; 2 designates a delay circuit; 3 designates an instruction decoder; 10 designates an n-bit shift register; 11 designates an NAND circuit; 6 designates an AND circuit that receives the instruction pulse from the instruction decoder 3 and the output signal of the NAND circuit 11, performs the logical AND operation between them, and outputs the operation result as the reset signal of the counter 1; and 12 designates a CPU. Since the counter 1, delay circuit 2, instruction decoder 3, AND circuit 6, n-bit shift register 10, NAND circuit 11 are the same as those of the watchdog timer of the embodiment 3 as shown in FIG. 5, the description thereof is omitted here.

Next, the operation of the present embodiment 4 will be described.

In the watchdog timer of the present embodiment 4 as shown in FIG. 6, the AND circuit 6 has its first input connected to the signal line WDC that transfers the instruction pulse output from the instruction decoder 3, and its second input connected to the output line 9 of the n-input NAND circuit 11 as in the watchdog timer of the foregoing embodiment 3 as shown in FIG. 5. The n-input NAND circuit 11 receives, as its n inputs, the bit values Q1–Qn of the n-bit shift register 10 that uses the clock $\phi 2$ as its shift clock. When the n-bit shift register 10 is not supplied with the initializing signal, the bit values Q1–Qn successively take the high level in synchronism with the clock $\phi 2$. In contrast, when the n-bit shift register 10 receives the initializing signal, all its bits are placed at the low level simultaneously.

As shown in FIG. 6, the n-bit shift register 10 uses as its initializing signal the output signal of the delay circuit 2 that delays the rising edge of the clock $\phi 2$ by the predetermined time period. The AND circuit 6 supplies its output to the counter 1 through the signal line 8, so that the output is used as the initializing signal of the counter 1. The clock $\phi 1$ serves as the count source of the counter 1, and the overflow signal output from the counter 1 is used as the reset signal of the microcomputer.

The operation of the present embodiment 4 will be described with reference in FIG. 4, the timing chart illustrating the operation of the foregoing embodiment 2 of the watchdog timer, in which the reference symbol $\phi$ designates the reference clock for operating the microcomputer. The count source $\phi 1$ supplied to the counter 1 is generated from the reference clock $\phi$ by the clock generator (not shown).

The delay amount T of the delay circuit 2 is set at a predetermined value so that the watchdog timer achieves the desired functions. The clock $\phi 2$ supplied to the delay circuit 2 is generated by the clock generator (not shown) as the clock $\phi 1$. The pulse signal whose rising edge is delayed by the predetermined time period T by the delay circuit 2 is supplied to the n-bit shift register 10. Each inverter 71 constituting the delay circuit 2 as shown in FIG. 7 consists of a plurality of MOS transistors or the like, and reduces its driving power as the supply voltage decreases, resulting an increase in the delay of the clock $\phi 2$.

When the delay of the delay circuit 2 is small, that is, when the microcomputer operates normally at the high voltage (normal voltage), the clock $\phi 2$ regularly input to the delay circuit 2 causes the high level signal to appear on the signal line 7 connected to the output of the delay the circuit 2. The high level signal on the signal line 7 is used as the clear signal of the n-bit shift register 10, which clears all the bit values Q1–Qn of the n-bit shift register 10 to the low level simultaneously. Accordingly., the n-input NAND circuit 11 places the signal line 9 connecting it to the AND circuit 6 at the high level, thereby supplying the AND circuit 6 with the high-level signal.

The AND operation, which is performed between the high-level signal on the signal line 9 and the instruction pulse on signal line WDC obtained by the instruction decoder 3 when it executes the watchdog timer initialization instruction, causes a high-level pulse to appear on the signal line 8, initializing the count of the counter 1. As a result, the count of the counter 1 does not overflow. This prevents the reset signal from being supplied to the system reset terminal (not shown), and hence the microcomputer is not reset.

In contrast with this, in the event of the high operation frequency, or the lower supply voltage in which the delay T exceeds the width of the instruction pulses generated by the execution of the watchdog timer initialization instructions, although the watchdog timer initialization instructions are executed regularly, the pulse signal does not appear on the signal line 7 connecting the delay circuit 2 to the n-bit shift register 10, and hence the signal line 7 is fixed at the low level. Therefore, the bit values Q1–Qn of the n-bit shift register 10 are not cleared, but are successively placed at the high level in synchronism with the clock $\phi 2$. If the signal line 7 continues the low level state for a certain time period, all the bit values Q1–Qn become high level, which will maintain the level on the output line 9 connected to the n-input NAND circuit 11 at the low level.

Thus, the level on the signal line 8 connecting the AND circuit 6 to the counter 1 is placed at the low level because of the logical AND between the low-level signal on the signal line 9 and the high-level instruction pulse on the signal line WDC which is obtained by the instruction decoder 3 when it executes the watchdog timer initialization instruction, and this prevents the counter 1 from initializing its count. Accordingly, the counter 1 continues counting the clock $\phi 1$, and overflows when the count reaches the predetermined value. As a result, the reset signal is supplied to the system reset terminal (not shown), causing the microcomputer to be reset. In the present embodiment 4, the n-bit shift register 10 ensures that the value on the signal line 7 is fixed at the low level. This makes it possible to prevent the microcomputer from being inappropriately reset because of a temporary voltage drop that will not lead to the runaway.

Furthermore, as shown in FIG. 6, the output of the NAND circuit 11 is also supplied to the CPU 12. This enables the CPU 12 to decide the output level of the NAND circuit 11 using the instruction for determining the output of the NAND circuit 11. Thus, such software can be created that switches the microcomputer operation to a lower speed when the output level of the NAND circuit 11 is low, for example. Alternately, in place of using the instruction for determining the output of the NAND circuit 11, it is possible for the CPU to generate an interrupt if the output of the NAND circuit 11 becomes low. Accordingly, such software can be created that causes the interrupt handler to switch the microcomputer operation to a lower speed when the output level of the NAND circuit 11 becomes low.

On the other hand, if the microcomputer suddenly runs away because of the incoming noise taking place in the high-voltage mode (normal voltage mode) in which the delay amount T is small, the instruction decoder 3 cannot execute the regular watchdog timer initialization instruction as the conventional watchdog timer also cannot. This will continuously increase the count of the counter 1 until it overflows and supplies the reset signal to the system reset terminal (not shown), resulting in the reset of the microcomputer.

As described above, the present embodiment 4 is configured such that it comprises the delay circuit 2 that delays the rising edge of the input clock $\phi 2$ by the predetermined time period and outputs the delayed pulse signal as the initializing signal of the n-bit shift register 10; the NAND circuit 11 for NANDing the plurality of outputs of the n-bit shift register 10; and the AND circuit 6 that carries out the logical AND operation between the output of the NAND circuit 11 and the instruction pulse output from the instruction decoder 3. This enables the watchdog time of the present invention, besides the function of the conventional watchdog timer for detecting the runaway of the microcomputer, to detect the narrow operation margin state of the microcomputer such as a low supply voltage or a high operation frequency, and to positively reset the microcomputer before it runs away. This offers an advantage of being able to ensure the safety of the system into which the microcomputer is incorporated. Furthermore, ensuring the detection of the reduction in the operation margin by the n-bit shift register 10 offers an advantage of being able to avoid the inappropriate reset of the microcomputer. In addition, because the CPU can detect by means of software the output signal level of the NAND circuit 11, and the software can generate an interrupt when necessary, the operation margin reduction can be processed using the software. This offers an advantage of being able to operate the microcomputer to its limit with ensuring the safety.

Embodiment 5

Figure 8:
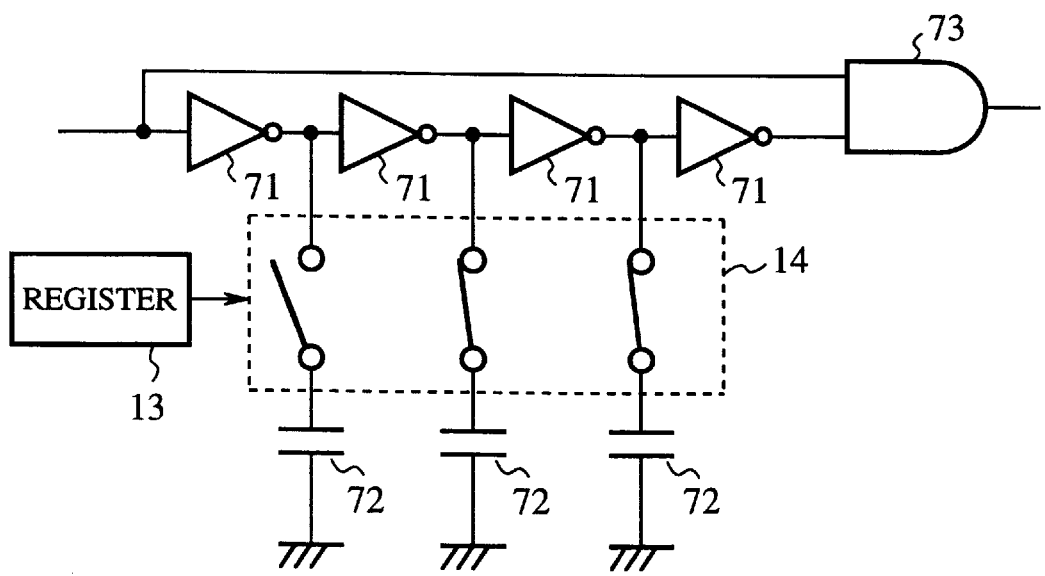
FIG. 8 is a block diagram showing another configuration of the delay circuit incorporated into the watchdog timer in accordance with the present invention.

FIG. 8 is a block diagram showing another configuration of the delay circuit 2 employed in the embodiments 1–4 of the watchdog timer in accordance with the present invention. In this figure, reference numerals 71 designate an even number of inverters connected in series; 72 designate load capacitors connected between a ground and nodes between adjacent inverters; the reference numeral 13 designates a register for storing a set value for determining the delay of the delay circuit; 14 designates a load capacitor determination switching circuit (first selector) for connecting the nodes between inverters with the load capacitors; and 73 designates an AND circuit for performing the logical AND operation between the output signal of the final stage inverter 71 and the input signal to the initial stage inverter 71 (such as the instruction pulse in FIG. 1 and the clock $\phi 2$ in FIGS. 3, 5 and 6). Since the configurations of the inverters 71, load capacitors 72 and AND circuit 73 are the same as those of the delay circuit 2 shown in FIG. 7, the description thereof is omitted here.

Next, the operation of the circuit as shown in FIG. 8 will be described.

As in the delay circuit as shown in FIG. 7, the delay amount of the delay circuit as shown in FIG. 8 increases with the decrease of the supply voltage level because it reduces the driving power of the inverters 71. In the present embodiment 5, the delay amount of the delay circuit is decided by means of software, and its set value is placed in the register 13. The set value placed in the register 13 controls the operation of the load capacitor determination switching circuit 14 to decide the load capacitors to be connected. Thus, the on-off operation of the load capacitor determination switching circuit 14 can vary the load capacitance of the delay circuit, enabling it to appropriately control its delay amount in accordance with its application.

Figure 9:
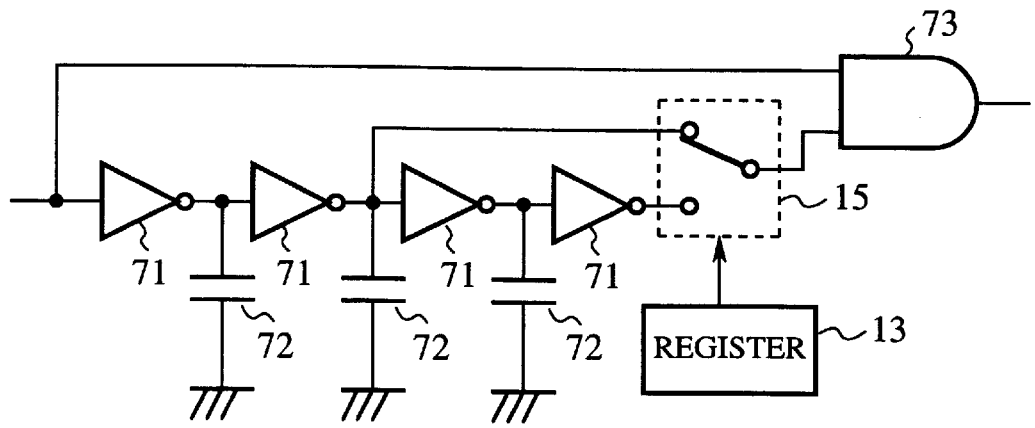
FIG. 9 is a block diagram showing still another, configuration of the delay circuit incorporated into the watchdog timer in accordance with the present invention.

FIG. 9 is a block diagram showing another configuration of the delay circuit as shown in FIG. 8. In this figure, reference numerals 71 designate an even number of inverters connected in series; 72 designate load capacitors connected between a ground and nodes between adjacent inverters; the reference numeral 13 designates a register; 15 designates a delay stage number determination switching circuit (second selector) for switching the number of stages of the inverters; and 73 designates an AND circuit for performing the logical AND operation between the output signal of the final stage inverter 71 selected by the switching circuit 15 and the input signal to the initial stage inverter 71. Since the configurations of the inverters 71, load capacitors 72, register 13 and AND circuit 73 are the same as those of the delay circuit shown in FIG. 8, the description thereof is omitted here.

Next, the operation of the circuit as shown in FIG. 9 will be described.

In the delay circuit as shown in FIG. 9, its delay also increases with the decrease of the supply voltage level because it reduces the driving power of the inverters 71. In the present embodiment 5, the delay amount of the delay circuit is decided by means of software, and its set value is placed in the register 13. The set value placed in the register 13 controls the operation of the delay stage number determination switching circuit 15. The on-off operation of the delay stage number determination switching circuit 15 can vary the load capacitance and the number of inverter stages of the delay circuit, enabling it to appropriately control its delay amount in accordance with its application.

As described above, the present embodiment 5 is configured such that it comprises the load capacitor determination switching circuit or the delay stage number determination switching circuit for adjusting the load capacitance or the number of inverters in the delay circuit in response to the set value placed in the register by means of software. This enables the delay circuit to vary its delay amount widely in accordance with the application. This offers an advantage of being able to positively reset the microcomputer before it runs away, making it possible to secure the safety of the system.

Embodiment 6

Figure 10:
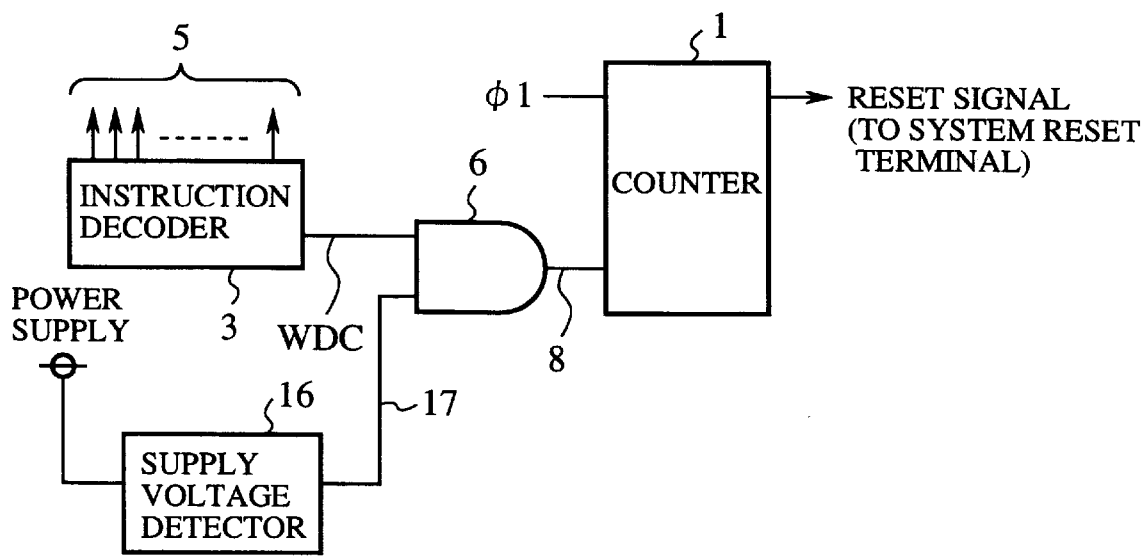
FIG. 10 is a block diagram showing a configuration of an embodiment 6 of the watchdog timer in accordance with the present invention.
Figure 11:
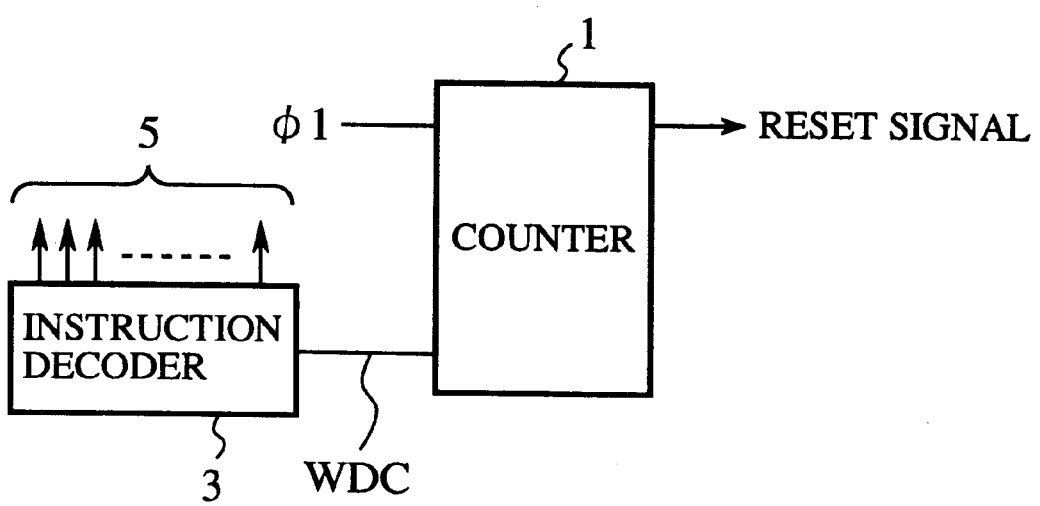
FIG. 11 is a block diagram showing a configuration of a conventional watchdog timer.

FIG. 10 is a block diagram showing a configuration of an embodiment 6 of the watchdog timer in accordance with the present invention. In this figure, the reference numeral 1 designates a counter; 3 designates an instruction decoder; 16 designates a supply voltage detector; and 6 designates an AND circuit. Since the counter 1, the instruction decoder 3 and the AND circuit 6 are the same as those of the watchdog timer of the embodiment 1 shown in FIG. 1, the description thereof is omitted here.

Next, the operation of the present embodiment 6 will be described.

The counter 1 counts the clock $\phi1$ produced by the clock generator (not shown) as the count source, and outputs an overflow signal when its count reaches a predetermined number. The overflow signal is supplied to the system reset terminal (not shown) of the microcomputer to be used as the reset signal of the microcomputer.

The instruction decoder 3 outputs decoded results 5 obtained by decoding instructions. When the instruction decoder 3 decodes the watchdog timer initialization instruction, it generates an instruction pulse, and supplies it onto the signal line WDC. The supply voltage detector 16 detects the level of the supply voltage, and supplies the AND circuit 6 with a high-level signal via the signal line 17 when the supply voltage level is greater than a predetermined value. The output of the supply voltage detector 16 depends only on the supply voltage without depending on the clock.

In the high-voltage mode (normal voltage mode) in which the microcomputer operates normally, the instruction decoder 3 outputs the instruction pulse through the signal line WDC. At the same time, the supply voltage detector 16 supplies the AND circuit 6 with the high-level signal indicating the normal voltage, causing the AND circuit 6 to supply a high-level pulse signal to the counter 1. The pulse signal functions as an initializing signal of the count. Thus, receiving the high-level pulse signal from the AND circuit 6, the counter 1 initializes its count. In the process of producing software, the watchdog timer initialization instructions are inserted into the software loop at such periods that can prevent the overflow of the counter 1.

Thus, when the microcomputer operates normally, the AND circuit 6 supplies the counter 1 with the high-level pulse signal in response to the instruction pulses regularly generated by the instruction decoder 3 so that the count of the counter 1 is regularly initialized by the high-level pulse signal. This prevents the counter 1 from supplying the overflow signal to the system reset terminal of the microcomputer as the reset signal. Thus, in the high-voltage mode (normal voltage mode) of the supply voltage, the instruction decoder 3 regularly executes the watchdog timer initialization instructions, and in response to this, the AND circuit 6 regularly supplies the high-level pulse signal to the counter 1. This can prevent the overflow of the count of the counter 1. In other words, the reset signal is not generated, and hence the microcomputer is not reset.

In contrast with this, when the supply voltage detector 16 detects that the supply voltage level is a predetermined value, a lower limit voltage that allows the normal operation of the microcomputer, for example, the supply voltage detector 16 supplies a low-level signal to the AND circuit 6. In this case, even though the watchdog timer initialization instructions are executed regularly, the high-level pulse signal does not appear on the signal line 8 connecting the AND circuit 6 to the counter 1. Thus, the counter 1 continues counting the clock $\phi1$ without being reset, and overflows when its count reaches the predetermined value. As a result, the reset signal is supplied to the system reset terminal (not shown) and the microcomputer is reset.

On the other hand, if the microcomputer suddenly runs away because of noise incoming in the high-voltage mode (normal voltage mode) in which the supply voltage detector 16 outputs the high-level signal, the watchdog timer of the present embodiment cannot execute the watchdog timer initialization instructions regularly as the conventional watchdog timer cannot. In this case, the counter 1 continues to increase its count until it overflows, and supplies the reset signal to the system reset terminal (not shown), resulting in the reset of the microcomputer.

As described above, the present embodiment 6 comprises the supply voltage detector 16 for detecting only the level of the supply voltage, and the AND circuit for carrying out the logical AND operation between the instruction pulse output from the instruction decoder 3 and the signal output from the supply voltage detector 17. This makes it possible, besides the functions of the conventional watchdog timer for detecting the runaway of the microcomputer, to positively reset the microcomputer before it runs away even in such cases as the operation margin detecting means using the delay circuit cannot detect the voltage drop because of the low supply voltage or because of the very low operation frequency. This offers an advantage of being able to ensure the safety of the system into which the microcomputer is incorporated.

What is claimed is:

1. A watchdog timer comprising:
a counter for counting a first clock, and for outputting, when its count reaches a predetermined number, a reset signal for resetting operation of a microcomputer;
an instruction decoder for decoding a watchdog timer initialization instruction regularly executed, and for putting a first pulse signal; and
a delay circuit for delaying a rising edge of the first pulse signal, and for supplying said counter with the delayed first pulse signal as an initializing signal of the count of said counter, wherein said delay circuit prevents the first pulse signal from being supplied to said counter if at least one of the following conditions exists: a) an operation frequency of the microcomputer is higher than a predetermined frequency, and b) a supply voltage to the microcomputer is lower than a predetermined value.

2. The watchdog timer according to claim 1, wherein said delay circuit comprises:
an even number of inverters connected in series;
a plurality of load capacitors connected between a ground and nodes between adjacent inverters; and
an AND circuit for performing an AND operation between a signal input to an initial stage inverter and a signal output from a final stage inverter of said even number inverters.

3. The watchdog timer according to claim 1, wherein said delay circuit comprises:
an even number of inverters connected in series;
a plurality of load capacitors connected between a ground and nodes between adjacent inverters;
an AND circuit for performing an AND operation between a signal input to an initial stage inverter and a signal output from a final stage inverter of said even number inverters;
a register for storing a set value for determining a value of said load capacitors in said delay circuit; and
a first selector for adjusting the value of said load capacitors in said delay circuit in response to the set value placed in said register.

4. The watchdog timer according to claim 1, wherein said delay circuit comprises:
an even number of inverters connected in series;
a plurality of load capacitors connected between a ground and nodes between adjacent inverters;
an AND circuit for performing an AND operation between a signal input to an initial stage inverter and a signal output from a final stage inverter of said even number inverters;
a register for storing a set value for determining a number of stages of said even number inverters in said delay circuit; and
a second selector for selecting the number of stages of said even number inverters in said delay circuit in response to the set value placed in said register.

5. The watchdog timer according to claim 1, wherein said delay circuit comprises:
an even number of inverters connected in series;
a plurality of load capacitors connected between a ground and nodes between adjacent inverters;
an AND circuit for performing an AND operation between a signal input to an initial stage inverter and a signal output from a final stage inverter of said even number inverters;
a register for storing a set value for determining a value of said load capacitors and a number of stages of said even number inverters in said delay circuit; and
a second selector for selecting the value of said load capacitors and the number of stages of said even number inverters in said delay circuit in response to the set value placed in said register.

6. A watchdog timer comprising:
a counter for counting a first clock, and for outputting, when its count reaches a predetermined number, a reset signal for resetting operation of a microcomputer;
an instruction decoder for decoding a watchdog timer initialization instruction regularly executed, and for generating a first pulse signal; and
a delay circuit for delaying a rising edge of a second clock having a same timing as the first pulse signal output from said instruction decoder, and for outputting as a second pulse signal the second clock with its rising edge delayed by a predetermined time period, wherein said delay circuit prevents the second pulse signal from being output if at least one of the following conditions exists: a) an operation frequency of the microcomputer is higher than a predetermined frequency, and b) a supply voltage to the microcomputer is lower than a predetermined value; and
an AND circuit for performing an AND operation between the first pulse signal supplied from said instruction decoder and the second pulse signal supplied from said delay circuit, and for supplying a result of the AND operation to said counter as an initializing signal of the count of said counter.

7. The watchdog timer according to claim 6, further comprising:
an n-bit shift register for successively loading a logical high level in response to the second clock, and for initializing, in response to the second pulse signal supplied from the delay circuit, all bits of said n-bit shift register simultaneously to a logical low level; and
an NAND circuit for carrying out an NAND operation between all the bits of said n-bit shift register, and supplies its operation result to said AND circuit,
wherein said n-bit shift register and said NAND circuit are interposed between said delay circuit and said AND circuit.

8. The watchdog timer according to claim 7, further comprising a CPU for discriminating the operation result of said NAND circuit using software.

9. The watchdog timer according to claim 8, wherein said CPU makes a decision of the operation result output from said NAND circuit, and generates an interrupt in response to the decision of the operation result before a reset signal is output by an overflow of the count of said counter.

10. The watchdog timer according to claim 6, wherein said delay circuit comprises:
an even number of inverters connected in series;
a plurality of load capacitors connected between a ground and nodes between adjacent inverters; and
an AND circuit for performing an AND operation between a signal input to an initial stage inverter and a signal output from a final stage inverter of said even number inverters.

11. The watchdog timer according to claim 6, wherein said delay circuit comprises:
an even number of inverters connected in series;
a plurality of load capacitors connected between a ground and nodes between adjacent inverters;

an AND circuit for performing an AND operation between a signal input to an initial stage inverter and a signal output from a final stage inverter of said even number inverters;

a register for storing a set value for determining a value of said load capacitors in said delay circuit; and a first selector for adjusting the value of said load capacitors in said delay circuit in response to the set value placed in said register.

12. The watchdog timer according to claim 6, wherein said delay circuit comprises:

an even number of inverters connected in series;

a plurality of load capacitors connected between a ground and nodes between adjacent inverters;

an AND circuit for performing an AND operation between a signal input to an initial stage inverter and a signal output from a final stage inverter of said even number inverters;

a register for storing a set value for determining a number of stages of said even number inverters in said delay circuit; and a second selector for selecting the number of stages of said even number inverters in said delay circuit in response to the set value placed in said register.

13. The watchdog timer according to claim 6, wherein said delay circuit comprises:

an even number of inverters connected in series;

a plurality of load capacitors connected between a ground and nodes between adjacent inverters;

an AND circuit for performing an AND operation between a signal input to an initial stage inverter and a signal output from a final stage inverter of said even number inverters;

register for storing a set value for determining a value of said load capacitors and a number of stages of said even number inverters in said delay circuit; and a second selector for selecting the value of said load capacitors and the number of stages of said even number inverters in said delay circuit in response to the set value placed in said register.

14. A watchdog timer comprising:

a counter for counting a first clock, and for outputting, when its count reaches a predetermined number, a reset signal for resetting operation of a microcomputer;

an instruction decoder for decoding a watchdog timer initialization instruction regularly executed, and for generating a first pulse signal used for initializing the count of said counter;

a supply voltage detector for detecting a level of a supply voltage to the microcomputer, and for outputting a high-level signal when the level of the supply voltage is greater than a predetermined level; and an AND circuit for performing an AND operation between the first pulse signal supplied from said instruction decoder and the high-level signal supplied from said supply voltage detector, and for supplying a result of the AND operation to said counter as an initializing signal of the count.

* * * * *